US007076717B2

(12) United States Patent
Grossman, IV et al.

(10) Patent No.: US 7,076,717 B2
(45) Date of Patent: Jul. 11, 2006

(54) TIME-AWARE BEST-EFFORT HOLE-FILLING RETRY METHOD AND SYSTEM FOR NETWORK COMMUNICATIONS

(75) Inventors: John H. Grossman, IV, Fremont, CA (US); Dustin L. Green, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 580 days.

(21) Appl. No.: 10/461,797

(22) Filed: Jun. 13, 2003

(65) Prior Publication Data

US 2004/0255219 A1    Dec. 16, 2004

(51) Int. Cl.
*G08C 25/02* (2006.01)
(52) U.S. Cl. ...................................... 714/748
(58) Field of Classification Search .................... None
See application file for complete search history.

(56) References Cited

U.S. PATENT DOCUMENTS

| 5,918,002 | A | 6/1999 | Klemets et al. | |
|---|---|---|---|---|
| 6,286,111 | B1 | 9/2001 | Snover | |
| 6,335,933 | B1 * | 1/2002 | Mallory | 370/394 |
| 6,850,769 | B1 * | 2/2005 | Grob et al. | 455/515 |
| 6,907,005 | B1 * | 6/2005 | Dahlman et al. | 370/236 |
| 6,920,504 | B1 * | 7/2005 | Bender et al. | 709/232 |

FOREIGN PATENT DOCUMENTS

EP        1006689        6/2000

OTHER PUBLICATIONS

R. Fox, "TCP Big Window and Nak Options," Jun. 1, 1989.
Papadopoulos et al., "Retransmission-Based Error Control for Continuous Media Application," Proc. of the IEEE International Workshop on Network and Operating Systems Support for Digital Audio & Video, 1996, pp. 5-12.

* cited by examiner

*Primary Examiner*—Christine T. Tu
(74) *Attorney, Agent, or Firm*—Lee & Hayes, PLLC

(57) ABSTRACT

This invention generally relates to a network communications technology. An implementation, described herein, performs a time-aware, best-effort, hole-filling communications retry function over a communications network. It does so in a manner that assumes successful reception of data unless the receiver indicates differently. The indication specifically identifies the missing data. With this indication, the sender resends only the specifically identified missing data. This abstract itself is not intended to limit the scope of this patent. The scope of the present invention is pointed out in the appending claims.

28 Claims, 6 Drawing Sheets

TIME-AWARE BEST-EFFORT HOLE-FILLING RETRY METHOD AND SYSTEM FOR NETWORK COMMUNICATIONS

TECHNICAL FIELD

This invention generally relates to a network communications technology.

BACKGROUND

In the realm of electronic communications where there is at least some degree of assumed unreliability, many communications systems have a mechanism for determining if a specific communications was successfully received or if the communications failed in some manner or both.

Take TCP for example. It is short for Transmission Control Protocol. It is one of the main protocols in TCP/IP networks. Whereas the IP protocol deals only with packets, TCP enables two hosts to establish a connection and exchange streams of data.

In general, TCP guarantees delivery of data and also guarantees that data will be delivered in the same order in which it was sent. To do that, TCP employs an acknowledgement-based retry procedure to detect and retry failed communications.

In TCP, a host sends a group (i.e., window) of data packets to a receiver on a communications network. The group may be called a "window." A TCP window is the amount of outstanding (i.e., unacknowledged by the recipient) data a sender is allowed to send on a particular connection before it gets an ACK back from the receiver that the receiver has gotten some of it.

ACK is short for acknowledgement code. It typically is a transmission control indicator indicating that a transmitted message was received uncorrupted or without errors or that the receiving station is ready to accept more transmissions. The receiver sends the code to the sender to indicate that the transmission has been accepted.

After the host sends the window of packets, it waits for an ACK from that receiver indicating that all or some packets of the window were successfully received. If it fails to receive an ACK within a defined retry time period, the host resends all of the packets of the window. So, if the sender does not receive an ACK, it assumes that the receiver did not receive any of the data since the last time the sender got an ACK from the receiver.

The ACK received by the host may indicate the last contiguous packet of a window that was successfully received. If so, the host resends all of the packets in the window following that packet specified by the ACK as being successfully received.

Conventional Retry Approaches

Conventional retry approaches typically resend large groups of data—maybe even an entire window worth of packets—when a communications failure is detected. Also, these conventional approaches are typically ACK-based. Furthermore, these conventional approaches typically do not account for any time-critical nature of the reception of data. An example of such a conventional approach is the TCP retry approach discussed above.

Those of ordinary art in the field are generally familiar with conventional retry approaches and specifically with TCP's retry approach.

SUMMARY

This invention generally relates to a network communications technology. An implementation, described herein, performs a time-aware, best-effort, hole-filling communications retry function over a communications network. It does so in a manner that assumes successful reception of data unless the receiver indicates differently. The indication specifically identifies the missing data. With this indication, the sender resends only the specifically identified missing data.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of the present invention, and thereby, to better explain the present invention. Furthermore, for ease of understanding, certain method steps are delineated as separate steps; however, these separately delineated steps should not be construed as necessarily order dependent in their performance.

The following description sets forth one or more exemplary implementations of a time-aware best-effort hole-filling retry method and system for network communications that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention; rather, the inventors have contemplated that the claimed present invention might also be embodied and implemented in other ways, in conjunction with other present or future technologies.

An example of an embodiment of a a time-aware best-effort hole-filling retry method and system for network communications may be referred to as an "exemplary hole-filling retry approach."

Introduction

Figure 4:
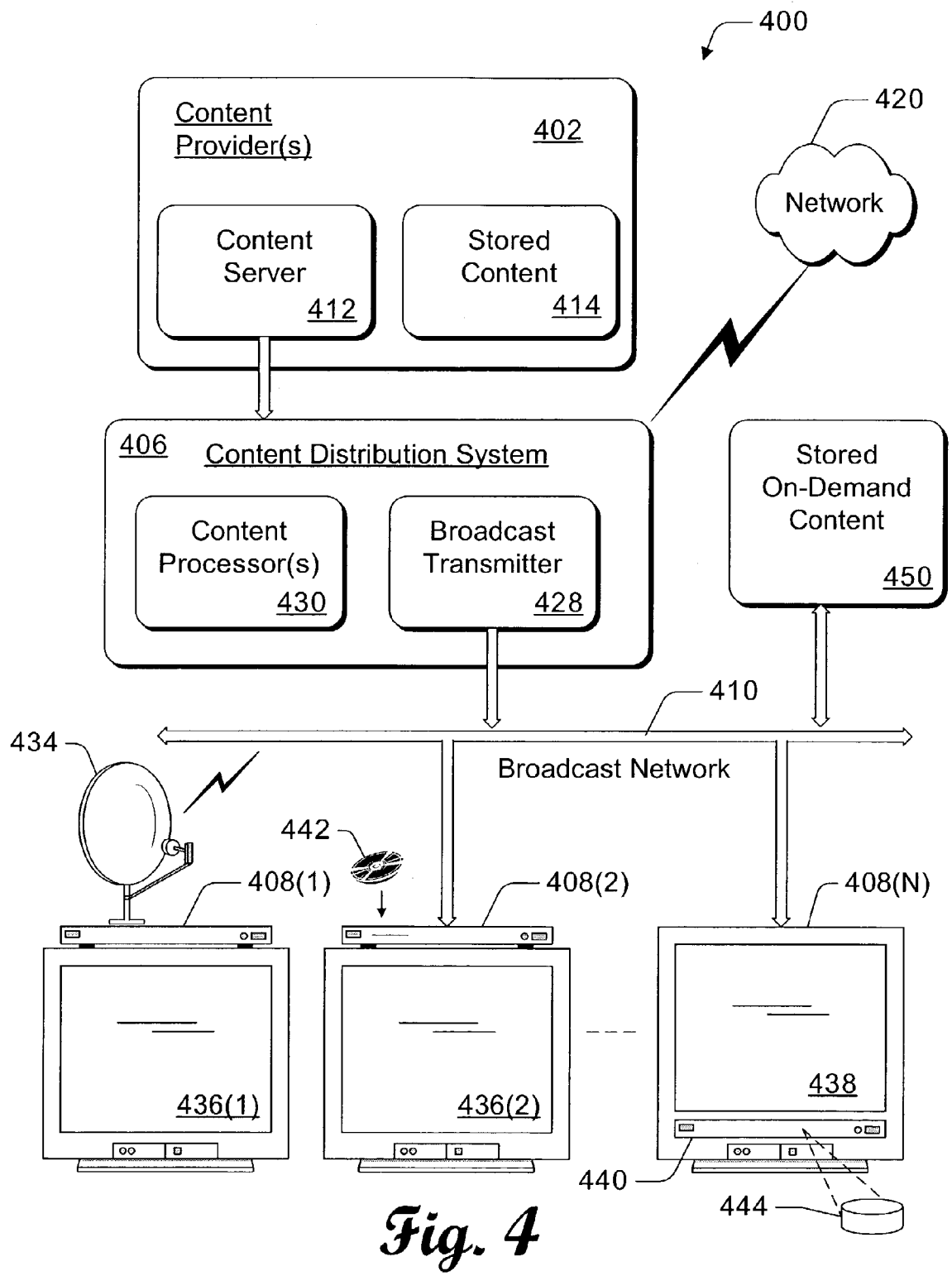
FIG. 4 illustrates exemplary environment in which an implementation described herein may be employed.
Figure 5:
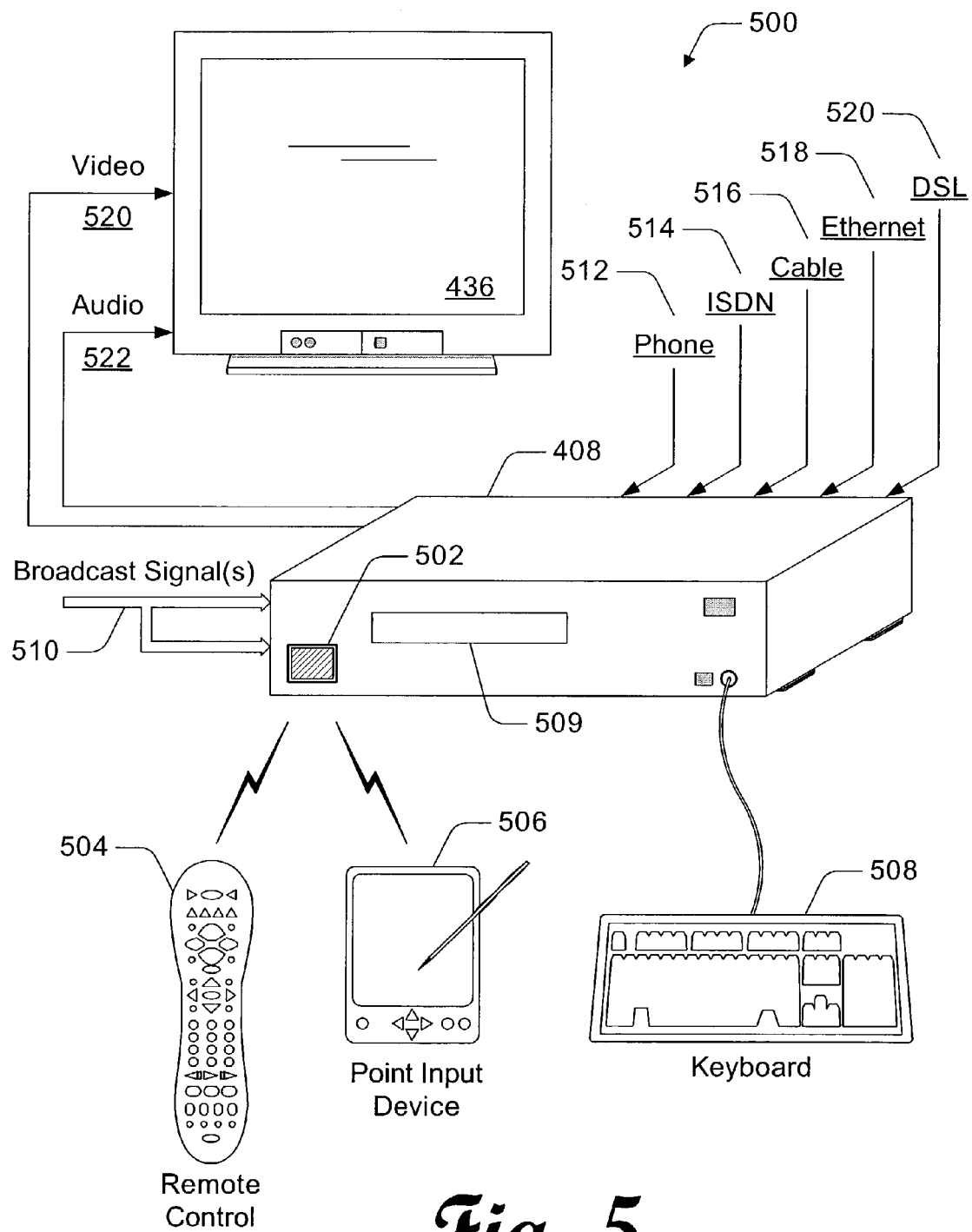
FIG. 5 illustrates of an example presentation device, a television, and various input devices that interact with the presentation device.
Figure 6:
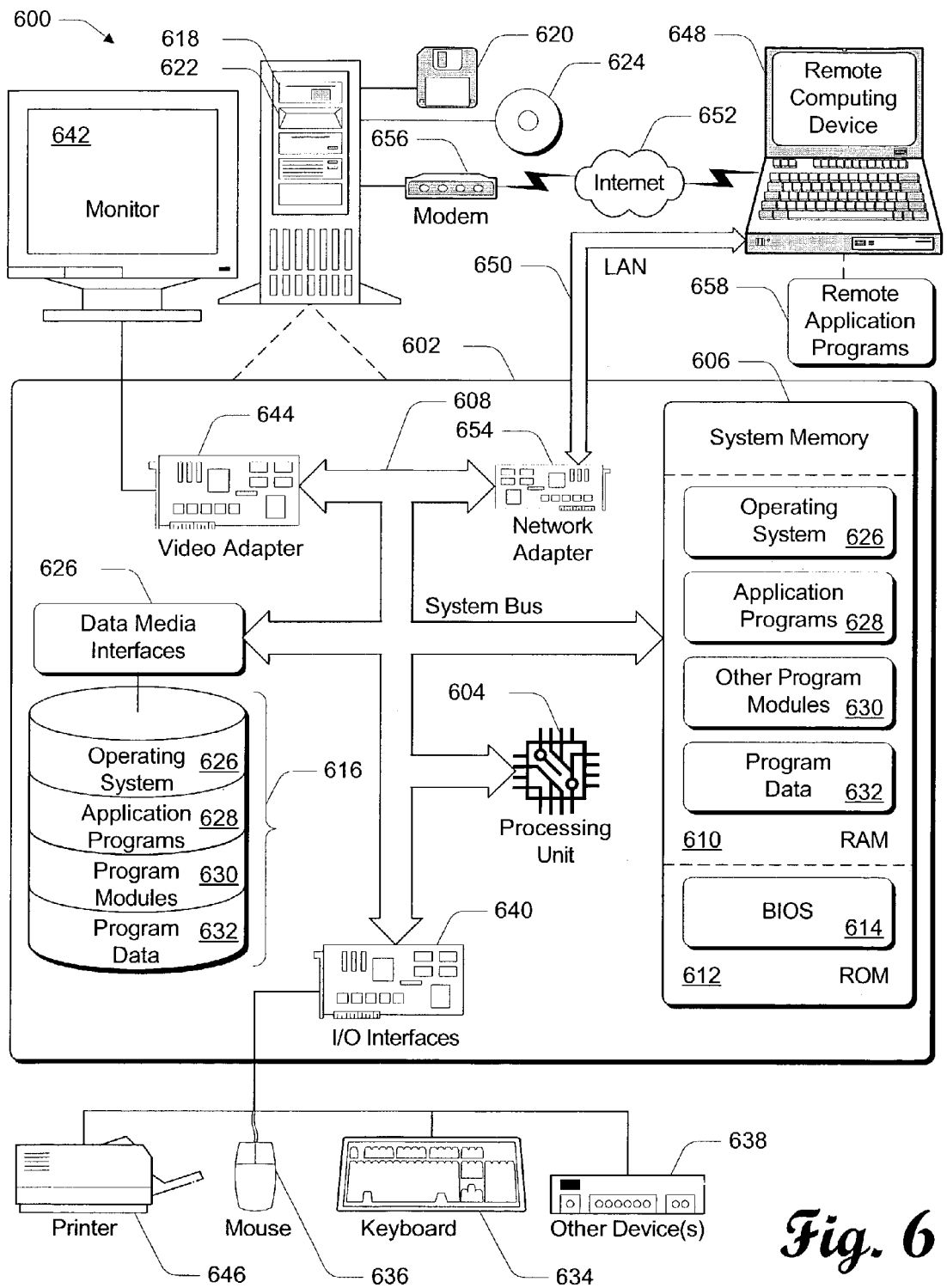
FIG. 6 is an example of a computing operating environment capable of (wholly or partially) implementing at least one embodiment described herein.

The one or more exemplary implementations, described herein, of the present claimed invention may be implemented by the presentation device 408 of FIGS. 4 and 5, the computer 602 of FIG. 6, and/or as part of a computing environment like that shown in FIGS. 4–6.

Conventional retry approaches typically resend large groups of data in response to a communications failure. Typically, these conventional approaches are ACK-based and do not account for any time-critical nature of the reception of data.

Such conventional retry approaches are inefficient for conditions where large amount of data is pouring one-way across the network, for example, in time-sensitive streaming multimedia data applications. The conventional approach is inefficient because of the frequent use of ACK packets from the receiver to the sender and because they tend to resend large blocks of data during a retry when only some of the resent data is missing (rather than only when all of the resent data is missing).

With conventional ACK-based approaches, there usually is a tradeoff involved when choosing the window size. In the absence of errors, a large window size allows one to send a lot of data at a high bandwidth via a high latency connection. A small window size reduces the amount of data that needs be re-sent unnecessarily when a packet is lost.

Typically, this trade-off produces a situation with long timeouts (e.g., the sender waiting for an ACK). If the latency from the sender to the receiver is long compared to the bit-rate, these conventional ACK-based approaches become less efficient as packet loss increases.

The exemplary hole-filling retry approach overcomes these drawbacks of the conventional retry approaches. It increases the efficiency of communication—especially for conditions where a large amount of data is pouring one-way across the network. Such as is the case with streaming multimedia data.

The exemplary hole-filling retry approach performs a time-aware, best-effort, hole-filling communications retry function over a communications network. Using a NACK-based approach, the sender only resends data to the receiver that the receiver identifies as having not been received.

It is best-effort because it is not guaranteed that the receiver will get the data. But the exemplary hole-filling retry approach does guarantee that the receiver will either get all data packets or realize that it did not get all data packets.

Also, the exemplary hole-filling retry approach has the capability to abandon attempts to obtain missing data when that data become irrelevant because it is too old. Unlike conventional approaches, the exemplary hole-filling retry approach may sustain an efficient, non-bursty, high-throughput connection across a communications network (e.g., the Internet), even in the presence of latencies that are high compared to the data-rate and significant packet loss.

The Exemplary Hole-Filling Retry Approach

Figure 1:
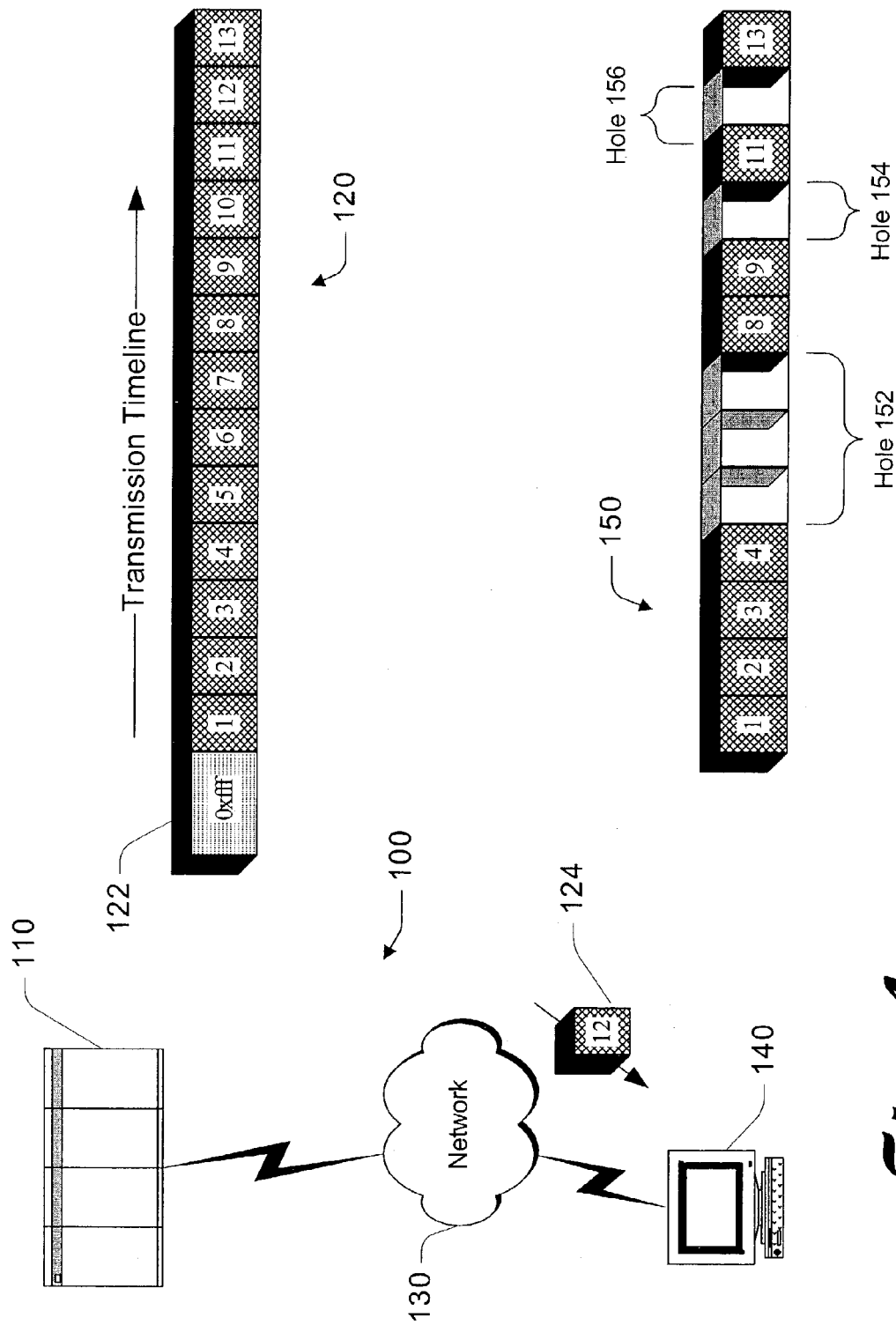
FIG. 1 is diagram illustrating a typical network and a snapshot of a communications state in accordance with an implementation described herein.

FIG. 1 illustrates a typical communications network with a host 110 (i.e., a sender herein), a communications network infrastructure 130 (such as the Internet), and a client device 140 (i.e., a receiver herein).

The exemplary hole-filling retry approach retries based on packets' sequence numbers. A sequence number is a number that increments by one for each packet sent. Using these numbers, a receiver may detect one or more missed packets (i.e., holes). The exemplary hole-filling retry approach utilizes UDP rather than TCP. It may be either unicast or multicast.

Group 120 represents an example of group of packets that the sender 110 sends across the network 130. It may have an offset 122 that help identify the particular group. Each packet is individually and sequentially numbered. In this example, they are numbered 1–13.

The sender 110 sends this window of packets to the receiver 140, one packet at a time. Group 150 represents an example of what the receiver 140 may have received at a slice of time during the communications with the sender.

As the receiver 140 receives the numbered packets, it buffers them in order of their sequential numbering. They may arrive out-of-order or not all, but as they do arrive the receiver places them in their appropriate place in reception group 150. One way to establish the appropriate place is to specify that all packets are a constant size. This is one way that a hole may be detected and its boundaries easily determined. Other approaches may be used to define the boundaries of holes.

When the receiver 140 receives a packet that has an out-of-order sequence number, it means that the receiver has missed an intervening numbered packet. These missing packets or groupings of packets are called "holes." The boundaries of a hole are defined by the existence of received packets surrounding the hole.

The example reception group 150 has three holes. Hole 152 represents missing packets #5, 6, and 7. Hole 154 represents missing packet #10. Hole 156 represents missing packet #12.

When the receiver detects a new hole, it adds the hole to the table of active holes. Each entry in the table has a defined retry time—which is a configurable parameter.

Since UDP does not guarantee an order, the packets may arrive out-of-order. The missing packets may be still in-transit to the receiver. That is illustrated by in-transit packet 124—which is missing packet #12.

Therefore, it is desirable to wait momentarily before reporting a hole. That momentary period may be called the hold-off (HO) period. So, a HO period avoids the problem of the receiver requesting a resend for a missing packet when that missing packet is likely on its way to the receiver. Accordingly, the retry time is initially set to a defined "hold-off" period.

If the retry time expires and the hole is still present, the receiver 140 sends a "hole report" UDP packet to the sender 110 notifying the sender of the one or more holes. This report is effectively negative-acknowledgement (NACKs) of the missing packets.

As the hole report may or may not reach the sender, the retry timer is typically reset to a re-report value (RR), which is a period of time until a re-report is made. The value of RR may be a customizable parameter, but it is typically a value somewhat greater than the observed round-trip latency of the network. The RR period is designed to give time for the sender to receive the report, respond, and for the receiver to receive that response.

The re-report value is typically greater than the hold-off value, because the re-report value is on the order of the round-trip latency of the network, whereas the hold-off time is typically some fraction of the one-way latency of the network.

Upon receipt of a hole report, the sender 110 re-sends the UDP packets indicated by the sequence number range contained in the hole report. If the receiver 140 does not receive a response for a while—for example, when the retry request or the response for the retry request is lost—the receiver again sends a retry request for the missing packets when the retry timer expires.

Any time a packet arrives that partially fills in a hole, the retry timer of the remaining portion of the hole (or the resultant two remaining portions of the hole) is set to the hold-off period.

An implementation described herein for streaming multimedia applications over IP has the following characteristics:

Every packet is the same size.
The guaranteed-delivery channel has data being sent over it on an on-going basis
It is run on top of UDP.

These are the characteristic of one particular implementation. However, other implementations may have other characteristics. For example, other implementations may run over other datagram delivery protocols other than UDP.

Active Hole Table

When the receiver 140 detects a new hole, it adds the hole to the table of active holes. Each entry in the table has a dynamically calculated retry time (RT). This table is stored in the memory of the receiver.

Since packets may arrive out-of-order, it is desirable to wait for a moment before reporting the hole. Therefore, the retry time is initially set to a defined hold-off (HO) period to avoid the problem of the receiver requesting a resend for a missing packet when that missing packet may still be in-transit to the receiver.

The re-report time (RR) and the initial "hold-off" (HO) period are dynamically adjustable based upon many factors, such as observed behavior of the network.

The hold-off period is typically set to a value that encompasses a large percentage of observed delays between packets when the packets are in the wrong order. In other words if A,B are packets, in that order, not necessarily adjacent, and they are observed to arrive as B, A (with possibly intervening packets), the delay A-B is the value that typically is encompassed by the hold-off period. However, the A-B delay should be observed only when A has not been NACKed, because otherwise the A after B might be a result of a retry.

Alternatively, the HO period may be set to the maximum one-way latency through the network less the minimum one-way latency through the network with the addition of some small adjustment (e.g., a delta).

Since the hole report may or may not reach the sender, the receiver waits for a short time (e.g., the RR value) for the sender to respond before resending the report.

Below is an example of an "Active Hole Table" that the receiver 140 may create. It lists entries for the active holes (based upon reception group 150 of FIG. 1), their current retry time, and their expiration time.

Example Active Hole Table

| Holes | Retry Time | Expiration-Time |
| --- | --- | --- |
| 5–7 | +120 | +500 |
| 10–10 | +10 | +700 |
| 12–12 | +10 | +730 |

The time values in the above table are in milliseconds and are only provided as illustrative example. A typical hold-off (HO) period may be on the order of 10 ms and a typical re-report (RR) period may be on the order of 100 ms.

Also, the times listed in this table are relative to the present time and are done so only for illustrative purposes. In reality, an implementation may specify an absolute time value (rather than relative).

The following lists some of the conditions under which RT for an entry into the active hole table is dynamic calculated or recalculated when using the exemplary hole-filling retry approach:

When entry in the hole table is created, the initial RT is set to now+HO
When a report is sent for a particular hole, the RT is reset to now+RR.
When a packet partially fills or splits a hole, then the RT for the resultant hole or holes are set to now+HO.

With the exemplary hole-filling retry approach, the entries in the table are kept ordered based upon RT. That way the entry to be retried soonest is always first.

Splitting Holes

When the receiver 140 receives a packet that only partially fills in a hole, that hole may be split or shortened. For example, if missing packet #5 of reception group 150 of FIG. 1 arrives at the receiver 140, the hole 152 is reduced. The new range for hole 152 is packets 6–7. If, for example, missing packet #6 of reception group 150 arrives, the hole 152 is effectively split into two holes: where packet #5 would be and where packet #7 would be.

If newly arrived packet fills into a middle of a hole, it effective splits the hole into two holes. The two new holes get a retry time (RT) of now+HO because HO is just enough to usually keep a hole report from being generated due to normal re-ordering of UDP packets that were sent in-order, and the packets to fill a hole are sent in order because the entire hole was originally reported as a single hole.

Expiration Time

Every packet has an expiration time-stamp (ETS). Since the data in the packet is time-sensitive, there is a time when its data is irrelevant. That means that there is a time when it no longer matters if the receiver actually receives the packet. That time is its expiration time.

The expiration time associated with each entry in the active hole table is the ETS of the packet defining the end boundary of the associated hole. For example, ETS for packet #11 of the reception group 150 of FIG. 1 is the value entered into the active hole table for hole 154 (for missing packet #10).

If RT>ETS of an entry in the active hole table, then the missing packets are considered irrelevant. As such, the receiver 140 will no longer attempt to obtain those missing packet(s) to fill that hole. That entry is removed from the table and a discontinuity is noted in the stream.

Pause in Transmissions

Under certain conditions, it is possible for the receiver to fail to recognize a hole that occurs immediately before a momentary pause in transmissions. Since subsequent packets have not yet arrived at the receiver (because they have not yet been sent), the receiver does not recognize the existence of a hole. A packet has failed to arrive, but the receiver does not yet know this. Therefore, the receiver does recognize the existence of the hole until full transmissions resumes.

However, this situation may be alleviated by sending occasional status packets especially when there is a pause in transmission. A status packet informs the receiver what the immediately previous packet should have been and/or what the next one will be. Assuming that there is a hole, the receiver may now recognize it and act accordingly.

Operation of Exemplary Hole-Filling Retry Approach at the Receiver

Figure 2:
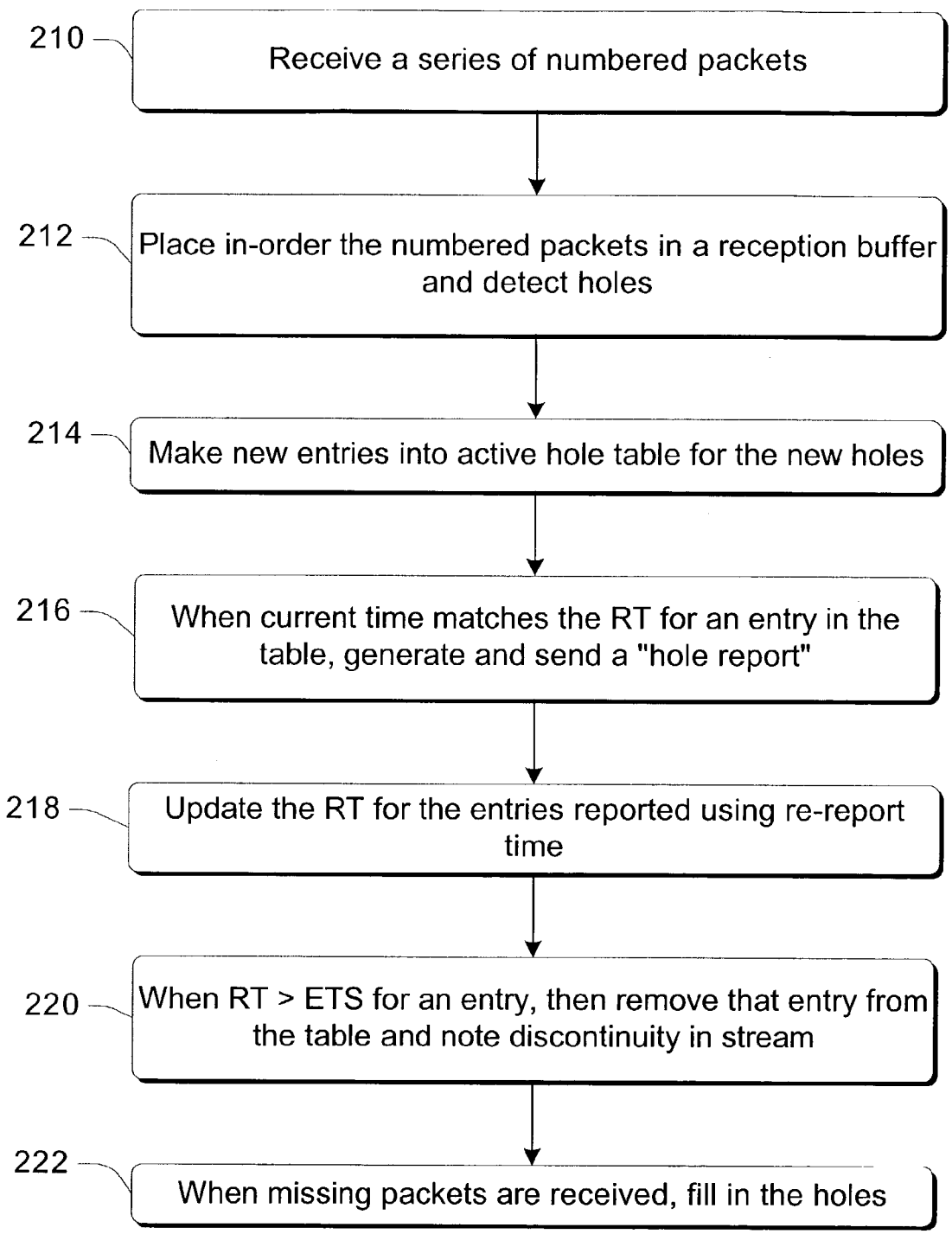
FIG. 2 is a flow diagram showing a methodological implementation described herein.

FIG. 2 shows a methodological implementation of the exemplary hole-filling retry approach. This methodological implementation may be performed in software, hardware, or a combination thereof.

At 210 of FIG. 2, the receiver 140 of FIG. 1 receives a series of numbered packets of a group of packets.

At 212, it receives into a reception buffer a collection of data packets (such group 150 of FIG. 1). It places each numbered packet in order of their numbering. It uses an offset (such as a defined constant packet size) to determine where each packet is placed in the buffer. While doing this, it leave holes for missing numbered packets. For example, hole 152 in FIG. 1 is for missing packets #5, 6, and 7.

At 214, the receiver fills-in a new entry into the active hole table. It enters each new hole as a new entry into the table. For each new entry, it calculates and enters the initial retry time (RT) for the new entries to be now+hold-off (HO) period. For each new entry, the receiver also enters the expiration time-stamp (ETS) for the received packet following and bordering the hole of that entry.

At 216, when the current time matches the RT for an entry in the table, the receiver 140 generates and sends a "hole report" packet to the sender 110 notifying the sender of the one or more holes.

At 218, after sending the hole report, the receiver updates the RT for the entries reported. It resets the RT to now+a re-report (RR) period.

At 220, when RT>ETS for a given entry, then it removes that entry from the table and notes a discontinuity in the stream. This means that a hole has expired and its removal from the table means that the receiver will no longer attempt to retrieve it.

At 222, when it receives a missing packet, it fills the hole (either partially or wholly). If the missing packet fills the hole completely, then its corresponding entry in the table is removed. If the missing packet only fills it partially, then it readjusts the size of the hole. If the missing packet splits the hole into two holes, then it re-adjusts the size of one hole and generates a new entry for the newly created hole having RT of now+HO for both the smaller original hole and the newly created hole.

This process continues as packets of reception groups are received.

Operation of Exemplary Hole-Filling Retry Approach at the Sender

Figure 3:
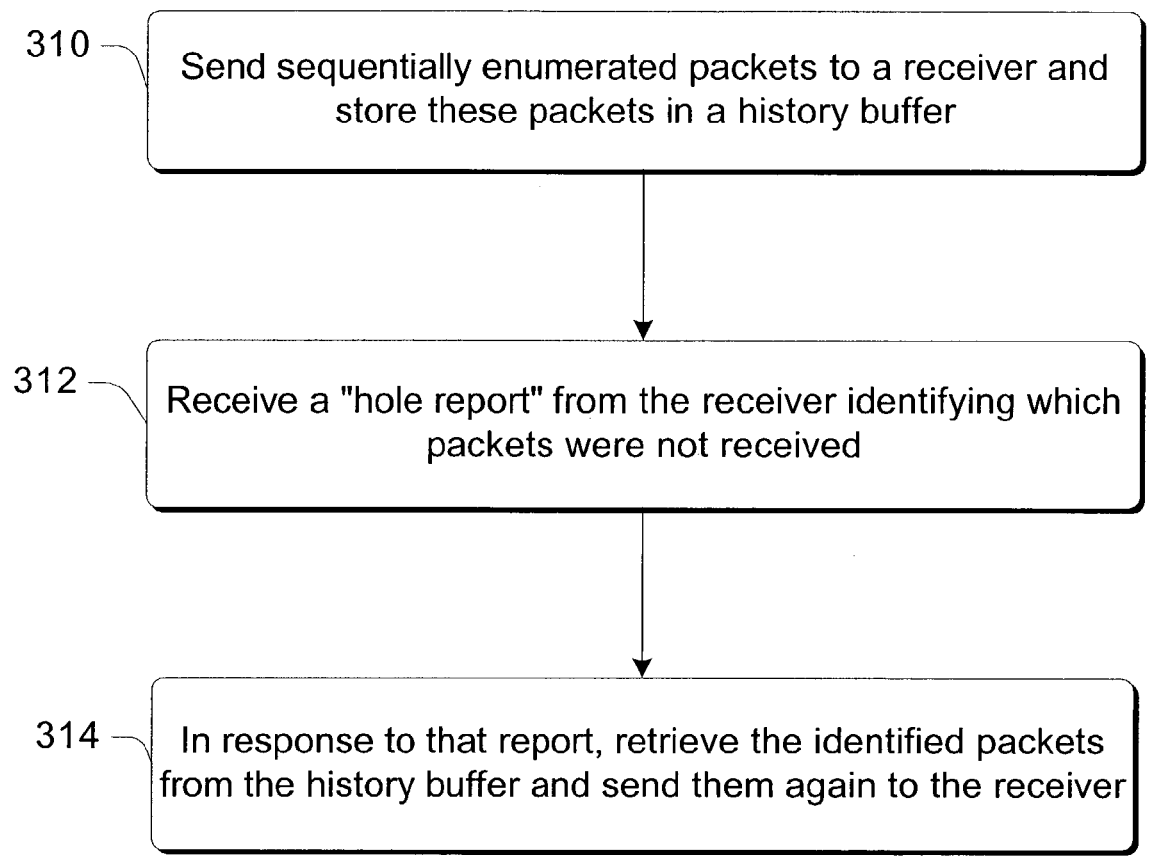
FIG. 3 is a flow diagram showing a methodological implementation described herein.

FIG. 3 shows a methodological implementation of the exemplary hole-filling retry approach. This methodological implementation may be performed in software, hardware, or a combination thereof.

At 310 of FIG. 3, the sender 110 of FIG. 1 sends sequentially enumerated packets to a receiver 140 and it stores these packets in a history buffer. The sender keeps this history buffer so that it can resend packets when requested to do so. Furthermore, the sender assigns an ETS to each packet.

At 312, the sender receives a "hole report" from the receiver identifying which packets were not received.

At 314, in response to that report, the sender retrieves the identified packets from its history buffer and sends them again to the receiver. If the sender gets a request to resend a packet that is no longer in the history buffer, it ignores the request.

Exemplary Environment

FIG. 4 illustrates an exemplary environment 400 in which the techniques, systems, and other aspects described herein may be implemented (partially or wholly). Exemplary environment 400 is a television entertainment system that facilitates distribution of multi-media. A typical digital video broadcast (DVB) network is an example of such an environment.

The environment 400 includes one or more multimedia content providers 402, a content distribution system 406, and one or more presentation devices 408(1), 408(2), . . . , 408(N) coupled to the content distribution system 406 via a broadcast network 410.

Multimedia content provider 402 includes a content server 412 and stored content 414, such as movies, television programs, commercials, music, and similar audio and/or video content. Content server 412 controls distribution of the stored content 414 from content provider 402 to the content distribution system 406. Additionally, content server 402 controls distribution of live content (e.g., content that was not previously stored, such as live feeds) and/or content stored at other locations to the content distribution system 406.

Content distribution system 406 may be coupled to a network 420, such as an intranet or the Internet. The content distribution system 406 includes a broadcast transmitter 428, and one or more content processors 430. Broadcast transmitter 428 broadcasts signals, such as cable television signals, across broadcast network 410.

Content distribution system 406 is representative of a headend service that provides multimedia content to multiple subscribers.

Broadcast network 410 can include a cable television network, RF, microwave, satellite, and/or data network, such as the Internet, and may also include wired or wireless media using any broadcast format or broadcast protocol. Additionally, broadcast network 410 can be any type of network, using any type of network topology and any network communication protocol, and can be represented or otherwise implemented as a combination of two or more networks.

Content processor 430 processes the content received from content provider 402 prior to transmitting the content across broadcast network 408. A particular content processor 430 may encode, or otherwise process, the received content into a format that is understood by the multiple presentation devices 408(1), 408(2), . . . , 408(N) coupled to broadcast network 410.

Presentation devices 408 can be implemented in a number of ways. For example, a presentation device 408(1) receives broadcast content from a satellite-based transmitter via a satellite dish 434. Presentation device 408(1) is also referred to as a set-top box or a satellite receiving device. Presentation device 408(1) is coupled to a television 436(1) for presenting the content received by the presentation device (e.g., audio data and video data), as well as a graphical user interface. A particular presentation device 408 can be coupled to any number of televisions 436 and/or similar devices that can be implemented to display or otherwise render content. Similarly, any number of presentation devices 408 can be coupled to a single television 436.

Presentation device 408(2) is also coupled to receive broadcast content from broadcast network 410 and provide the received content to associated television 436(2). Presentation device 408(N) is an example of a combination television 438 and integrated set-top box 440. In this example, the various components and functionality of the set-top box are incorporated into the television, rather than using two separate devices. The set-top box incorporated into the television may receive broadcast signals via a satellite dish (similar to satellite dish 434) and/or via broadcast network 410. In alternate implementations, presentation devices 406 may receive broadcast signals via the Internet or any other broadcast medium.

The exemplary environment 400 also includes stored on-demand content 442, such as Video On-Demand (VOD) movie content. The stored on-demand content can be viewed with a presentation device 408 through an onscreen movie guide, for example, and a viewer can enter instructions to stream a particular movie, or other stored content, down to a corresponding presentation device 408.

Thus far, this exemplary environment 400 has been described in terms of a digital video broadcast (DVB) environment. Indeed, that is an exemplary environment. However, the exemplary hole-filling retry approach may be implemented without the whole of the DVB environment itself. Instead, it may be implemented by a standalone presentation device, such as illustrated by devices 408(1), 408(2), ..., 408(N).

Standalone presentation devices 408(1), 408(2), ..., 408(N) accesses digital video from a storage medium 444, such as a DVD disk. It provides the content from the medium to an associated television 439. Examples of such a standalone presentation device include DVD player, a personal video recorder, etc.

Exemplary Presentation Device

FIG. 5 illustrates an exemplary implementation 500 of a presentation device 408 shown as a standalone unit that connects to a television-436. Presentation device 408 can be implemented in any number of embodiments, including as a set-top box, a satellite receiver, a TV recorder with a hard disk, a game console, an information appliance, a DVD player, personal video recorder, personal computer, media center, and so forth.

Presentation device 408 includes a wireless receiving port 502, such as an infrared (IR) or Bluetooth wireless port, for receiving wireless communications from a remote control device 504, a handheld input device 506, or any other wireless device, such as a wireless keyboard. Handheld input device 506 can be a personal digital assistant (PDA), handheld computer, wireless phone, or the like. Additionally, a wired keyboard 508 is coupled to communicate with the presentation device 408. In alternate embodiments, remote control device 504, handheld device 506, and/or keyboard 508 may use an RF communication link or other mode of transmission to communicate with presentation device 408.

Presentation device 408 may have a storage medium reader 509 for reading content storage media, such as DVD disks. A standalone or non-standalone presentation device 408 may include the storage medium reader 509.

Presentation device 408 may receive one or more broadcast signals 510 from one or more broadcast sources, such as from a satellite or from a broadcast network. Presentation device 408 includes hardware and/or software for receiving and decoding broadcast signal 510, such as an NTSC, PAL, SECAM or other TV system video signal.

Presentation device 408 also includes hardware and/or software for providing the user with a graphical user interface by which the user can, for example, access various network services, configure the presentation device 408, and perform other functions.

Presentation device 408 may be capable of communicating with other devices via one or more connections including a conventional telephone link 512, an ISDN link 514, a cable link 516, an Ethernet link 518, a DSL link 520, and the like. Presentation device 408 may use any one or more of the various communication links 512–520 at a particular instant to communicate with any number of other devices.

Presentation device 408 generates video signal(s) 520 and audio signal(s) 522, both of which are communicated to television 436. The video signals and audio signals can be communicated from presentation device 408 to television 436 via an RF (radio frequency) link, S-video link, composite video link, component video link, or other communication link.

Although not shown in FIG. 5, the presentation device 408 may include one or more lights or other indicators identifying the current status of the device. Additionally, the presentation device may include one or more control buttons, switches, or other selectable controls for controlling operation of the device.

Exemplary Computing System and Environment

FIG. 6 illustrates an example of a suitable computing environment 600 within which an exemplary hole-filling retry approach, as described herein, may be implemented (either fully or partially). The computing environment 600 may be utilized in the computer and network architectures described herein.

The exemplary computing environment 600 is only one example of a computing environment and is not intended to suggest any limitation as to the scope of use or functionality of the computer and network architectures. Neither should the computing environment 600 be interpreted as having any dependency or requirement relating to any one or combination of components illustrated in the exemplary computing environment 600.

The exemplary hole-filling retry approach may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary hole-filling retry approach may be described in the general context of computer-executable instructions, such as program modules, being executed by a computer. Generally, program modules include routines, programs, objects, components, data structures, etc. that perform particular tasks or implement particular abstract data types. The exemplary hole-filling retry approach may also be practiced in distributed computing environments where tasks are performed by remote processing devices that are linked through a communications network. In a distributed computing environment, program modules may be located in both local and remote computer storage media including memory storage devices.

The computing environment 600 includes a general-purpose computing device in the form of a computer 602. The components of computer 602 may include, but are not limited to, one or more processors or processing units 604, a system memory 606, and a system bus 608 that couples various system components, including the processor 604, to the system memory 606.

A system bus may be implemented as one or more of any of several types of bus structures, including a memory bus or memory controller, a peripheral bus, an accelerated graphics port, or a local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus also known as a Mezzanine bus.

Computer 602 typically includes a variety of computer-readable media. Such media may be any available media that is accessible by computer 602 and includes both volatile and non-volatile media, removable and non-removable media.

The system memory 606 includes computer-readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 may be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 616, magnetic disk 620, optical disk 624, ROM 612, and/or RAM 610, including by way of example, an operating system 626, one or more application programs 628, other program modules 630, and program data 632.

A user may enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device may also be connected to the system bus 608 via an interface, such as a video adapter 644. In addition to the monitor 642, other output peripheral devices may include components, such as speakers (not shown) and a printer 646, which may be connected to computer 602 via the input/output interfaces 640.

Computer 602 may operate in a networked environment using logical connections to one or more remote computers, such as a remote computing device 648. By way of example, the remote computing device 648 may be a personal computer, portable computer, a server, a router, a network computer, a peer device or other common network node, and the like. The remote computing device 648 is illustrated as a portable computer that may include many or all of the elements and features described herein, relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which may be internal or external to computer 602, may be connected to the system bus 608 via the input/output interfaces 640 or other appropriate mechanisms. It is to be appreciated that the illustrated network connections are exemplary and that other means of establishing communication link(s) between the computers 602 and 648 may be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components, such as the operating system, are illustrated herein as discrete blocks, although it is recognized that such programs and components reside at various times in different storage components of the computing device 602, and are executed by the data processor(s) of the computer.

Computer-Executable Instructions

An implementation of an exemplary hole-filling retry approach may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 6 illustrates an example of a suitable operating environment 600 in which an exemplary hole-filling retry approach may be implemented. Specifically, the exemplary hole-filling retry approach(s) described herein may be implemented (wholly or in part) by any program modules 628–630 and/or operating system 626 in FIG. 6 or a portion thereof.

The operating environment is only an example of a suitable operating environment and is not intended to suggest any limitation as to the scope or use of functionality of the exemplary hole-filling retry approach(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer-Readable Media

An implementation of an exemplary hole-filling retry approach may be stored on or transmitted across some form of computer-readable media. Computer-readable media may be any available media that may be accessed by a computer. By way of example, computer-readable media may comprise, but is not limited to, "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer-readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, communication media may comprise, but is not limited to, wired media such as a wired network or direct-wired connection, and wireless media such as acoustic, RF, infrared, and other wireless media. Combinations of any of the above are also included within the scope of computer-readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-readable medium having computer-executable instructions that, when executed by a computer, perform a method comprising:
   receiving data packets of a group having a defined sequential order;
   determining whether packets of that group are missing;
   requesting retransmission of only packets that are determined to be missing;
   awaiting reception of retransmissions of one or more missing packets;
   while awaiting, repeating the determining and requesting until no more packets of the group are missing or until the remaining missing packets are irrelevant, the repeating further comprising:
   associating a specified retry time with a missing packet, wherein the specified retry time defines when requesting retransmission of that missing packet occurs;
   if that missing packet is still missing at the specified retry time then dynamically adjusting the specified retry time for that missing packet to add a specified re-reporting time period.

2. A medium as recited in claim 1, wherein a missing packet is irrelevant when one or more received packets of the group are adjacent the missing packet.

3. A medium as recited in claim 1, wherein each packet has an expiration time stamp (ETS) and a missing packet is irrelevant when the present time is past the ETS of one or more received packets that are adjacent the missing packet.

4. A medium as recited in claim 1, wherein packets in the group have a defined expiration time and missing packets are irrelevant when the defined expiration time of one or more of the received packets has occurred.

5. A medium as recited in claim 1, wherein the packets of the group are sequentially numbered.

6. A medium as recited in claim 1, wherein each packet of the group is equivalent in size.

7. A medium as recited in claim 1, wherein the requesting for re-transmission occurs a defined time interval after the determining.

8. A computing device comprising:
   an interface to a communications network for sending and receiving data;
   the medium as recited in claim 1.

9. A computer-readable medium having computer-executable instructions that, when executed by a computer, perform a method comprising:
   receiving data packets of a group having a defined order;
   identifying which packets of the group are missing;
   sending a negative-acknowledgement (NACK) that identifies the missing packets;
   awaiting reception of retransmissions of one or more of the identified missing packets;
   while awaiting, repeating the identifying and sending until the remaining missing packets are irrelevant;
   when a packet is determined to be missing, associating a specified retry time with the missing packet;
   performing the requesting for retransmission of that missing packet at the specified retry time for that packet;
   repeating the determining;
   if that missing packet is determined to still be missing, then:
      dynamically adjusting the specified retry time to add a specified re-reporting time period;
      repeating the requesting for retransmission of that missing packet at the adjusted retry time for that packet.

10. A medium as recited in claim 9, wherein a missing packet is irrelevant when one or more received packets of the group are adjacent the missing packet.

11. A medium as recited in claim 9, wherein each packet has an expiration time stamp (ETS) and a missing packet is irrelevant when the present time is past the ETS of one or more received packets that are adjacent the missing packet.

12. A medium as recited in claim 9, wherein the method further comprises:
receiving retransmissions of one or more missing packets;
repeating the identifying and sending.

13. A medium as recited in claim 9, wherein the method further comprises:
receiving retransmissions of one or more missing packets;
repeating the identifying and sending until no more packets of the group are missing.

14. A medium as recited in claim 9, wherein the method further comprises:
receiving retransmissions of one or more missing packets;
repeating the determining and requesting until the remaining missing packets are irrelevant or until there are no more missing packets.

15. A medium as recited in claim 9, wherein packets in the group have a defined expiration time, the method further comprises:
receiving retransmissions of one or more missing packets;
repeating the determining and requesting until the remaining missing packets are irrelevant because the defined expiration time of one or more of the packets has occurred, or until there are no missing packets.

16. A medium as recited in claim 9, wherein the defined order of the group of packets is sequential.

17. A medium as recited in claim 9, wherein the packets of the group are sequentially numbered.

18. A medium as recited in claim 9, wherein the requesting for re-transmission occurs a defined time interval after the determining.

19. A computing device comprising:
an interface to a communications network for sending and receiving data;
the medium as recited in claim 9.

20. A communications retry method comprising:
receiving data packets of a group having a defined order;
determining whether packets of that group are missing;
requesting retransmission of only packets that are determined to be missing;
when a packet is determined to be missing, associating a specified retry time with the missing packet;
performing the request for retransmission of that missing packet at the specified retry time for that packet;
repeating the determining;
if that missing packet is determined to still be missing, then:
dynamically adjusting the specified retry time to add a specified re-reporting time period;
repeating the request for retransmission of that missing packet at the adjusted retry time for that packet.

21. A method as recited in claim 20 further comprising:
receiving retransmissions of one or more missing packets;
repeating the determining and requesting.

22. A method as recited in claim 20 further comprising:
receiving retransmissions of one or more missing packets;
repeating the determining and requesting until no more packets of the group are missing.

23. A method as recited in claim 20 further comprising:
receiving retransmissions of one or more missing packets;
repeating the determining and requesting until the remaining missing packets are irrelevant or until there are no more missing packets.

24. A method as recited in claim 20, wherein packets in the group have a defined expiration time, the method further comprises:
receiving retransmissions of one or more missing packets;
repeating the determining and requesting until the remaining missing packets are deemed irrelevant because the defined expiration time of one or more of the packets has occurred or until there are no more missing packets.

25. A method as recited in claim 20, wherein the defined order of the group of packets is sequential.

26. A method as recited in claim 20, wherein the packets of the group are sequentially numbered.

27. A method as recited in claim 20, wherein the requesting for re-transmission occurs a defined time interval after the determining.

28. A computer comprising one or more computer-readable media having computer-executable instructions that, when executed by the computer, perform the method as recited in claim 20.

* * * * *